3,471,273
Patented Oct. 7, 1969

3,471,273
GRAFT COPOLYMER POUR POINT DEPRESSORS
David W. Young, Homewood, and Henry V. Isaacson, Oak Park, Ill., assignors to Sinclair Research, Inc., New York, N.Y., a corporation of Delaware
No Drawing. Filed Aug. 21, 1964, Ser. No. 391,324
Int. Cl. C10l 1/18
U.S. Cl. 44—62   5 Claims

ABSTRACT OF THE DISCLOSURE

The pour point of hydrocarbon fuel oils is reduced by the inclusion of a minor amount of a graft copolymer of about 1 to 30 weight percent polyvinyl acetate with about 70 to 99 weight percent ethylene grafted thereto.

---

This invention relates to a novel graft polymer having utility as a distillate fuel oil pour point depressor. More specifically, the invention is directed to a pour depressor which is a mineral oil-soluble, graft polymer of ethylene and polyvinyl acetate which is added to distillate fuel mineral oils such as heating oils, diesel fuels, kerosene, aviation turbo-jet fuels and other fuels that are subject to low temperatures, to produce low cold test hydrocarbon fuels.

With the increase in the use of hydrocarbon fuels of all kinds, a serious problem has arisen in areas frequently subject to low temperatures in the cold test characteristics of fuels. Particularly, serious problems have been encountered by heating oils and diesel and jet fuels that have too high a pour point, resulting either in distributional or operating difficulties or both. For example, the distribution of heating oils by pumping or syphoning is rendered difficult or impossible at temperatures around or below the pour point of the oil. Furthermore, the flow of the oil at such temperatures through the filters cannot be maintained, leading to the failure of the equipment to operate.

Polymers have not been widely used as pour point depressors; moreover, many hydrocarbons polymers, as demonstrated by U.S. Patent No. 3,048,479 to Ilnyckyj et al., are not effective as pour point depressors and may in fact increase the pour point. Much has been accomplished in the field of middle distillate pour point depression as is shown in U.S. Patent Nos. 3,037,850 to Wythe et al.; 3,069,245 to Wythe et al.; 3,093,623 to Ilnyckyj; 3,100,695 to Slysh et al.; and 3,126,364 to Ilnyckyj. In fact, these patents show the use of pour depressors of copolymers of vinyl acetate and ethylene either alone or in mixtures with other compounds, e.g. alkylated polystyrene.

It has now been found that a mineral oil-soluble graft polymer of about 1 to 30% by weight polyvinyl acetate and about 70 to 99% by weight ethylene when added to a distillate fuel oil in small, effective amounts, substantially reduces the pour point of the oil. Advantageously, the graft polymer is of about 3 to 25% by weight polyvinyl acetate and about 75 to 97% by weight ethylene and has an average molecular weight of about 350 to 10,000, preferably about 350 to 4,000, by the vapor pressure differential method.

The novel graft polymer of the present invention may be conveniently obtained by charging, for instance, about 5 to 30% solution of polyvinyl acetate in benzene or other aromatic hydrocarbon solvent to a reactor. To the reactor may be then introduced ethylene at an elevated pressure, e.g. about 1,500 to 3,500 p.s.i. The temperature of the reactor may then be gradually increased to about 300 to 400° F. and held at about that temperature until an oil-soluble polymer is obtained, e.g. in about 5 to 10 hours. An oil-soluble graft polymer of this invention is thereby produced.

The polyvinyl acetate used in this invention may be produced by suitable methods of polymerization. More specifically, the polyvinyl acetate can be produced by the controlled polymerization of vinyl acetate monomer in a solvent, e.g., isopropanol, and a catalyst, e.g. lauroyl peroxide. The polymerization may be terminated after a specified time by the addition of an inhibitor, e.g. hydroquinone. The polymers produced by this process often have average molecular weight in the range of from about 250 to 5,000 molecular weight, preferably about 300 to 3,500 molecular weight.

The novel additive of the present invention has particular utility in petroleum fuel oils such as domestic heating oils, diesel fuels, kerosene, aviation turbo-jet fuels, etc. In this regard, it has been found that surfactants, water, particulate matter, corrosive and hydrocarbon-attacking bacteria are factors which may cause serious problems, for example, in jet fuels. There is every indication that the problems caused by these factors will be even more serious in the jet fuels of tomorow. It has been found that passing a fuel through an adsorptive clay treater removes surfactants and particulate matter and eliminates corrosion. It has also been found that bacteria removal then occurs concurrently. Adsorbents such as attapulgus clay, are especially effective in this jet fuel cleanup. This adsorbent has been found to remove surfactants, which removal increases the efficiency of the removal of particulate matter and water. Further, the clay treating reduces filter-plugging from bacteria slimes, etc. However, the adsorptive clay treater does not remove the additive of the present invention. This unique advantage enables the user to add the instant pour point depressor immediately and later treat it to remove impurities by the adsorptive clay treater without further addition of pour point depressor.

The distillate fuel oils are often petroleum middle distillates and commonly have relatively high pour points, for instance, at least about −10° F. or higher. The oils can be in their relatively crude state, or they can be treated in accordance with well-known commercial methods such as acid or caustic treatment, solvent refining, clay treatment, hydrotreating, etc. Fuel oils which can be improved by the graft polymers of this invention include, for instance, hydrocarbon fractions boiling primarily in the range of about 300° to 750° F. The fuel oils can be straight run distillate fuel oils, catalytically—or thermally—cracked distillate fuel oils or mixtures of straight run fuel oils, naphthas and the like with cracked distillate stocks. The cracked materials will frequently be about 15 to 70 volume percent of the fuel.

The amount of the graft polymer added to the base oils may be dependent upon the particular oil employed, but in all cases will be that sufficient to reduce the pour point significantly. Often the amount used will fall in the range of about 0.01 to 2% or more by weight, preferably about 0.025 to 1% by weight, based on the mineral oil.

The graft polymer of the present invention is that which is produced when polyvinyl acetate

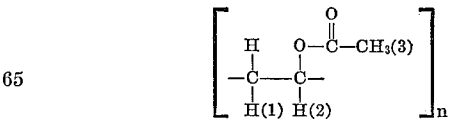

is reacted with ethylene. The positions, (1), (2), and (3) may be converted to the free radical state by hydrogen abstraction; and, at these three positions, polymerization can be initiated to form polyvinyl acetate laterally substituted by polyethylene chains. At high pressures, extensive modification of polyvinyl acetate occurs and polymeric ethylene chains may be formed at more than one position on the majority of the vinyl acetate monomers. Also, some blocking is likely to occur, i.e. polyethylene chains are likely to form between polyvinyl acetate monomers. The graft polymerization is effected until a suitable product is formed. It is to be noted that the present invention relates to these graft polymers and not to copolymers as used by the prior art.

The following examples are included further to illustrate the present invention.

EXAMPLE I

A one-liter resin kettle was charged with 500 grams of pure vinyl acetate, 50 grams isopropanol and 4.2 grams of lauroyl peroxide. The reaction was held at about 170–180° F. After an induction period of several minutes, the polymerization reaction proceeded spontaneously and was terminated after 45 minutes by the addition of 0.05% of hydroquinone inhibitor. The polymerization mixture was then placed on a steam bath to remove unreacted monomer and solvent. The yield of polymer on a weight basis was 97%, the molecular weight was about 300.

EXAMPLE II

A 20% solution of polyvinyl acetate, made by the procedure of Example I, in benzene was charged to a two-liter stainless steel autoclave along with 15 grams of lauroyl peroxide. The amount of polyvinyl acetate was 90 grams in 360 grams benzene. The autoclave was then purged with nitrogen gas. After this, ethylene (tech. grade) was introduced at the indicated pressure, and the contents were heated with electric heat to 200° to 240° F. and stirred for seven hours. The temperatures and pressures at the various times are listed in Table I.

TABLE I

| Time (minutes) | Pressure (p.s.i.) | Temperature, °F |
|---|---|---|
| 0 | 495 | 68 |
| 15 | 630 | 120 |
| 30 | 845 | 200 |
| 40 | 910 | 248 |
| 105 | 900 | 243 |
| 190 | 850 | 229 |
| 315 | 810 | 235 |
| 410 | 775 | 235 |
| 455 | 770 | 237 |

On cooling the bomb the pressure was 430 p.s.i. at 68° F.

The polymer was removed from the bomb in solvent, and the solvent was removed with heat. Infra-red tests indicated that the product has about 5–10% by weight of ethylene. The polymer was not soluble in No. 2 fuel oil having the following specifications:

| | |
|---|---|
| Gravity, API | 34.6 |
| Flash, °F. | 136.0 |
| Viscosity at 100° F. C.S. | 2.548 |
| Cloud Point, °F. | −4 |
| Pour Point, °F. | −5 |
| Olefines, FIA, vol. percent | 0.2 |
| Aromatics, FIA, vol. percent | 33.2 |
| Sulfur, wt. percent | 0.39 |
| Bromine number | 7.7 |
| ASTM distillation, °F.: | |
| I.B.P. | 330 |
| 10% | 406 |
| 50% | 514 |
| 90% | 594 |
| E.P. | 632 |

EXAMPLE III

A solution of 20 grams of the polyvinyl acetate as made in Example I in 200 grams of benzene was added to a bomb. Ethylene gas was added to the bomb containing the polyvinyl acetate solution. The pressure was held at 1,930 p.s.i. at 40° F. Di-tert.butyl peroxide (4 grams) was present in the bomb. Temperature was increased at a rate of about 3° per minute and a run was made for 6.6 hours at 350° F. The bomb was then cooled, and the polymer solution was removed and filtered. Dry acetone was then added to remove the polymer, and the polymer was then air-dried for 40 hours. The graft polymer product was soluble in the fuel, and the polymer had a molecular weight of about 398 by the vapor pressure differential method. The graft polymer was added in varying proportions to the fuel oil specified in Example II and the pour point was reduced as listed in Table II.

TABLE II

| Percent graft polymer: | ASTM pour point, °F. |
|---|---|
| 0 | −5 |
| 0.025 | −40 |
| 0.050 | −45 |
| 0.090 | −50 |

EXAMPLE IV

Additional tests were performed on the polymer produced in Example III in the fuel described in Example II.

The amounts of polymer added and the results noted are reported in Table III.

TABLE III

| Percent graft polymer: | ASTM pour point, °F. |
|---|---|
| 0.025 | −15 |
| 0.050 | −60 |
| 0.10 | −80 |

EXAMPLE V

Two pour point depressants were tested with the fuel oil specified in Example II. Sample I was a copolymer of 20% styrene and 80% $C_{18}$ and $C_{20}$-alpha olefins, and Sample II was a copolymer of ethylene and vinyl acetate. The results are listed in Table IV below.

TABLE IV

| Sample | Percent sample | ASTM pour point, °F. |
|---|---|---|
| I | 0.025 | −40 |
| I | 0.050 | −40 |
| I | 0.090 | −45 |
| II | 0.025 | −35 |
| II | 0.050 | −35 |
| II | 0.090 | −45 |

It can be seen from the examples that the graft polymers of this invention provide effective pour point depressors for hydrocarbon fuels and that they compare favorably with those of the prior art. It can be further seen that oil-soluble ethylene-modified polyvinyl acetate made by a relatively low pressure process was not soluble in the fuel oil tested while the graft polymer made by the process of the invention reduced the pour point of the oil significantly.

It is claimed:

1. A distillate hydrocarbon fuel oil containing a small amount, sufficient to provide the said oil with a reduced pour point, of a mineral oil-soluble, graft polymer of about 1 to 30% polyvinyl acetate and about 70 to 99% by weight ethylene, said graft polymer having a molecular weight of about 350 to 10,000.

2. The composition of claim 1 wherein the polyvinyl acetate has a molecular weight of about 250 to 5,000.

3. The composition of claim 1 wherein the graft polymer is of about 3 to 25% by weight polyvinyl acetate and about 75 to 97% ethylene by weight.

4. The composition of claim 3 wherein the polyvinyl acetate has a molecular weight of about 250 to 5,000.

5. The composition of claim 1 wherein the amount of graft polymer in the oil is about 0.025 to 1% by weight.

References Cited

UNITED STATES PATENTS

| | | | |
|---|---|---|---|
| 2,947,718 | 8/1960 | Rugg et al. | 260—878 |
| 2,379,728 | 7/1945 | Lieber et al. | 44—62 XR |
| 3,048,479 | 8/1962 | Ilnyckyj et al. | 44—62 |
| 3,093,623 | 6/1963 | Ilnyckyj et al. | 44—62 |

FOREIGN PATENTS 884,732  12/1961  Great Britain.

DANIEL E. WYMAN, Primary Examiner
Y. H. SMITH, Assistant Examiner

U.S. Cl. X.R.

44—70